United States Patent
Slemmer et al.

(10) Patent No.: US 7,139,524 B2
(45) Date of Patent: Nov. 21, 2006

(54) SYSTEMS AND METHODS FOR DELIVERING A STORED MESSAGE TO A SUBSCRIBER

(75) Inventors: John Slemmer, Norcross, GA (US); Ryan Schaub, Snellville, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 149 days.

(21) Appl. No.: 10/840,055

(22) Filed: May 6, 2004

(65) Prior Publication Data

US 2005/0250475 A1 Nov. 10, 2005

(51) Int. Cl.
*H04H 1/00* (2006.01)
(52) U.S. Cl. ............... 455/3.02; 455/412.1; 455/412.2
(58) Field of Classification Search ........... 455/412.1, 455/414.1, 507, 412.2, 3.02, 414.2, 415, 455/427, 466, 12.1, 569.2
See application file for complete search history.

(56) References Cited

U.S. PATENT DOCUMENTS

| | | | |
|---|---|---|---|
| 5,517,678 A | 5/1996 | Klank et al. | |
| 5,835,487 A | 11/1998 | Campanella | |
| 5,864,546 A | 1/1999 | Campanella | |
| 6,038,594 A | 3/2000 | Puente et al. | |
| 6,201,798 B1 | 3/2001 | Campanella et al. | |
| 6,249,514 B1 | 6/2001 | Campanella | |
| 6,272,339 B1* | 8/2001 | Wiedeman | 455/426.1 |
| 6,385,647 B1 | 5/2002 | Willis et al. | |
| 6,510,317 B1 | 1/2003 | Marko et al. | |
| 6,529,477 B1 | 3/2003 | Toporek et al. | |
| 6,618,367 B1 | 9/2003 | Riazi et al. | |
| 2001/0037210 A1* | 11/2001 | Hirayama | 705/1 |
| 2002/0103728 A1* | 8/2002 | Naghshineh et al. | 705/29 |
| 2003/0006910 A1* | 1/2003 | Dame | 340/945 |
| 2003/0028890 A1* | 2/2003 | Swart et al. | 725/91 |
| 2003/0158656 A1* | 8/2003 | Zvi | 701/208 |
| 2004/0120273 A1* | 6/2004 | Border et al. | 370/310 |
| 2005/0236470 A1* | 10/2005 | Hirayama | 235/375 |
| 2005/0239399 A1* | 10/2005 | Karabinis | 455/3.02 |

* cited by examiner

*Primary Examiner*—Duc M. Nguyen
*Assistant Examiner*—Anthony S. Addy
(74) *Attorney, Agent, or Firm*—Lee & Hayes, PLLC

(57) ABSTRACT

A method for delivering a stored message to a satellite radio receiver is disclosed. The method includes receiving a request to retrieve the message, receiving the message, encoding the message for satellite transmission, and transmitting the message for delivery to the satellite radio receiver.

20 Claims, 2 Drawing Sheets

SYSTEMS AND METHODS FOR DELIVERING A STORED MESSAGE TO A SUBSCRIBER

BACKGROUND

This application is related, generally and in various embodiments, to systems and methods for delivering a stored message to a satellite radio receiver.

For many people, the ability to access stored messages such as text or voice messages has allowed them to become more productive, both at work and at home. Although accessing messages from the home or office has become a very common practice, accessing such messages while driving a vehicle has not become as common. There are many people who do not possess a mobile device capable of receiving stored messages. For those who do possess such a device, accessing messages via the device while driving a vehicle can be relatively unsafe and relatively expensive. For example, accessing stored messages via a wireless telephone or pager usually requires a driver to take their eyes off the road for a period of time. In addition, the airtime used to access the stored message is often billed at a relatively expensive rate.

SUMMARY

In one general respect, this application discloses embodiments of a method for delivering a stored message to a satellite radio receiver. According to various embodiments, the method includes receiving a request to retrieve the message, receiving the message, encoding the message for satellite transmission, and transmitting the message for delivery to the satellite radio receiver.

In another general respect, this application discloses embodiments of a computer program stored on a computer readable medium. According to various embodiments, the computer program includes instructions to retrieve a message stored for a subscriber, encode the message for satellite transmission, and transmit the message for delivery to a satellite radio receiver associated with the subscriber.

Other embodiments of the disclosed invention will be or become apparent to one skilled in the art upon review of the following drawings and detailed description. It is intended that all such additional embodiments be included within this description, be within the scope of the disclosed invention, and be protected by the accompanying claims.

DETAILED DESCRIPTION

It is to be understood that the figures and descriptions of the disclosed invention have been simplified to illustrate elements that are relevant for a clear understanding of the disclosed invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
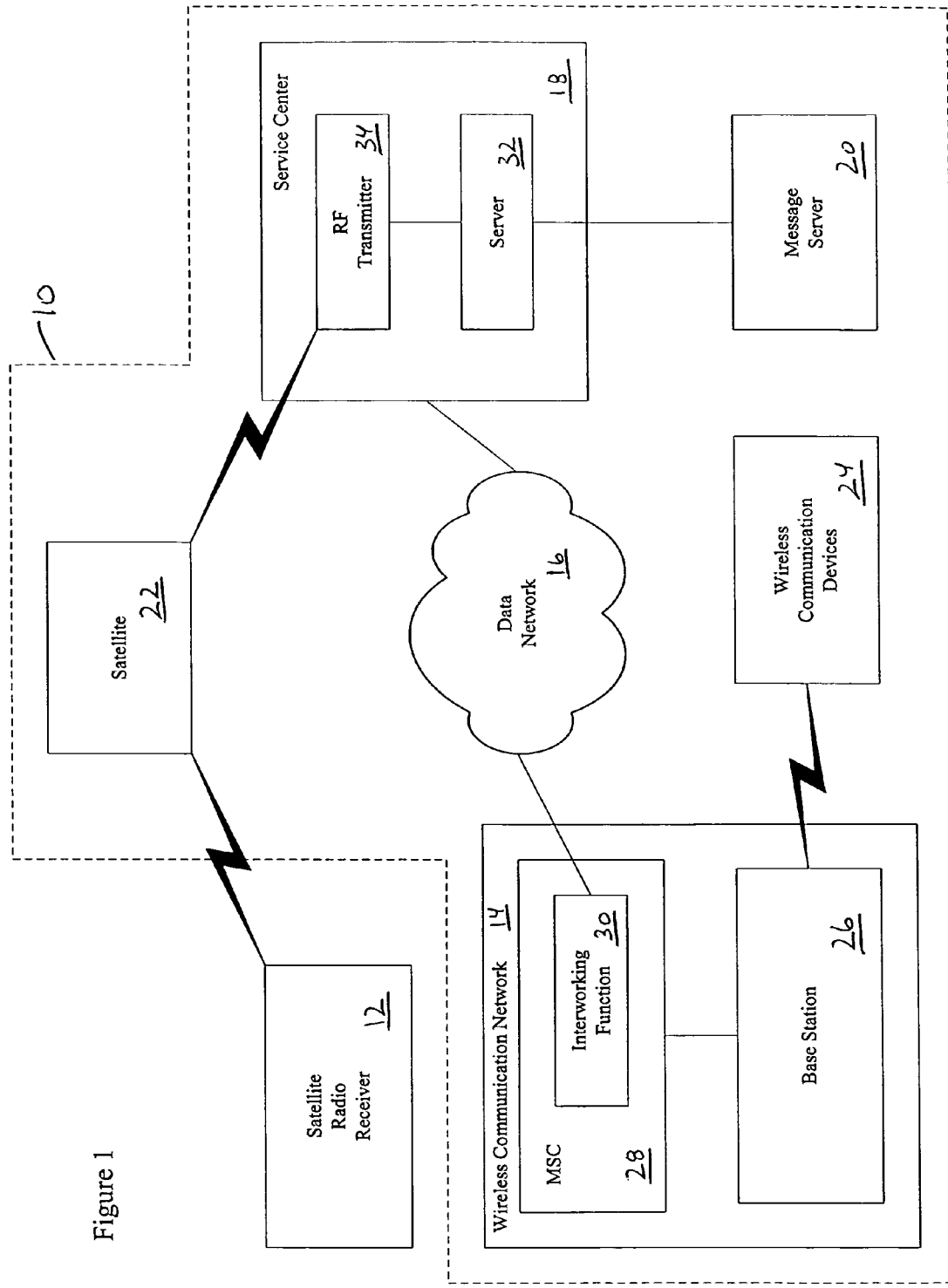
FIG. 1 illustrates various embodiments of a system for delivering a stored message to a satellite radio receiver.

FIG. 1 illustrates various embodiments of a system 10 for delivering a stored message to a satellite radio receiver 12. The system 10 includes a wireless communication network 14, a data network 16, a service center 18, a message server 20, and a satellite 22. The system 10 delivers messages stored for a subscriber to message delivery service to a satellite radio receiver 12 associated with the subscriber.

The wireless communication network 14 is in communication with a plurality of wireless communication devices 24 and includes a base station 26 and a mobile switching center 28. The base station 26 is in communication with the wireless communication devices 24 and the mobile switching center 28 is in communication with the base station 26. According to various embodiments, the wireless communication devices 24 are embodied as wireless telephones, wireless pagers, wireless personal digital assistants, or any combination thereof. The mobile switching center 28 includes an interworking function 30 that supports communication between the wireless communication network 14 and the data network 16.

The data network 16 is in communication with the wireless communication network 14. According to various embodiments, the data network 16 comprises a portion of a local area network, a wide area network, a metropolitan area network, or the internet.

The service center 18 is in communication with the data network 16 and includes a server 32 configured for encoding a message for satellite transmission and a RF transmitter 34 for transmitting the message to the satellite 22 for delivery to the satellite radio receiver 12. According to various embodiments, the server 32 is further configured for converting a text message retrieved from the message server 20 to a voice message. According to various embodiments, the server 32 is further configured for digitizing messages retrieved from the message server 20. Although only one service center 18 is shown in FIG. 1, it is understood that, according to various embodiments, the system 10 includes more than one service center 18 in communication with the data network 16.

The message server 20 is in communication with service center 18. According to various embodiments, the message server 20 is for storing electronic mail messages, electronic fax messages, voice messages, or any combination thereof Although the message server 20 is shown in FIG. 1 as being separate from the data network 16, it is understood that, according to various embodiments, the message server 20 comprises a portion of the data network 16. In addition, although only one message server 20 is shown in FIG. 1, it is understood that, according to various embodiments, the system 10 includes more than one message server 20 in communication with the service center 18.

The satellite 22 is in communication with the service center 18 and the satellite radio receiver 12. Although only one satellite 22 is shown in FIG. 1, it is understood that, according to various embodiments, the system 10 includes more than one satellite 22. It is further understood that, according to various embodiments, the satellite 22 is in communication with more than one service center 18 and more than one satellite radio receiver 12.

Figure 2:
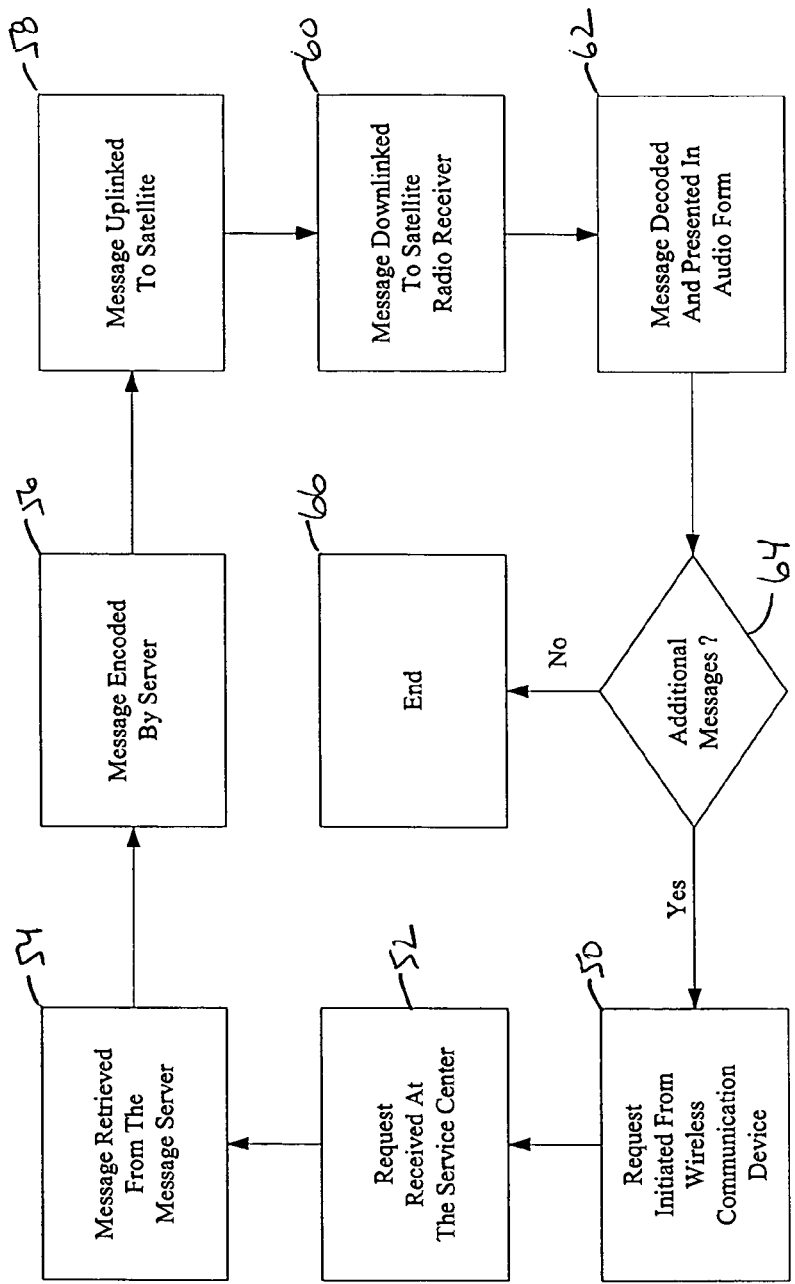
FIG. 2 illustrates various embodiments of a process flow through the system of FIG. 1.

FIG. 2 illustrates various embodiments of a process flow through the system 10 of FIG. 1. The process begins at block 50 where a subscriber to a message delivery service initiates a request to have a stored message delivered to the subscriber via a satellite radio receiver 12 associated with the subscriber. The request is initiated from a wireless communication device 24 and includes identification information and a password associated with the subscriber. According to various embodiments, the request is initiated by calling a specific telephone number, entering the identification information and the password, then selecting a message delivery option. The request is forwarded from the wireless communication device 24 to the service center 18 via the wireless communication network 14 and the data network 16.

From block 50, the process advances to block 52, where the request is received at the server 32 at the service center 18. The identification information included with the request indicates the location of the message server 20 that the stored message can be retrieved from, and indicates the specific satellite radio receiver 12 that the message is to be delivered to. The password included with the request serves to authenticate that the request is a valid request from a current subscriber and to authorize that the message be retrieved from the message server 20.

From block 52, the process advances to block 54, where the server 32 retrieves the message from the message server 20. From block 54, the process advances to block 56, where the server 32 encodes the message for satellite transmission and forwards the message to the RF transmitter 34. According to various embodiments, the encoding includes converting a text message retrieved from the message server 20 to a voice message. According to other embodiments, the encoding includes digitizing the message retrieved from the message server 20.

From block 56, the process advances to block 58, where the RF transmitter 34 receives the message forwarded from the server 32 and uplinks the message to the satellite 22. From block 58, the process advances to block 60, where the satellite 22 receives the message transmitted from the RF transmitter 34 and downlinks the message to the satellite radio receiver 12 specified by the identification information included in the request. According to various embodiments, the uplink frequency is different than the downlink frequency.

From block 60, the process advances to block 62, where the message is received at the satellite radio receiver 12, decoded, and presented in audio form. It is understood that the satellite radio receiver 12 is tuned to the downlink frequency to receive the message. From block 62, the process advances to block 64, where it is determined if the subscriber desires to have additional stored messages delivered to the satellite radio receiver 12.

If the subscriber does not desire to have additional stored messages delivered to the satellite radio receiver 12, the process advances from block 64 to block 66 where the process ends. If the subscriber does desire to have additional messages delivered to the satellite radio receiver 12, the process returns from block 64 to block 50, where the process described in blocks 50–64 is repeated. According to various embodiments, the process described in blocks 50–64 can be repeated any number of times.

In order to perform the processes described in blocks 54 and 56, the server 32 may execute a series of instructions. The instructions may be software code to be executed by the server 32. The software code may be stored as a series of instructions or commands on a computer readable medium such as a random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written in C using procedural programming techniques, or in Java or C++ using object-oriented programming techniques.

While several embodiments of the disclosed invention have been described, it should be apparent, however, that various modifications, alterations and adaptations to those embodiments may occur to persons skilled in the art with the attainment of some or all of the advantages of the disclosed invention. For example, according to various embodiments, the subscriber, at block 50, initiates a request that a plurality of stored messages be delivered to the satellite radio receiver 12. It is therefore intended to cover all such modifications, alterations and adaptations without departing from the scope and spirit of the disclosed invention as defined by the appended claims.

What is claimed is:

1. A method for delivering a stored message to a satellite radio receiver, the method comprising:
    receiving a password protected request from a subscriber via a wireless communication device associated with a first subscription service to retrieve the subscriber's personal message, wherein the first subscription service comprises a wireless telephone system and wherein the password protected request provides access to the wireless telephone system;
    retrieving the message from a second subscription service, wherein the second subscription service comprises a digital data network that transfers data using Internet Protocol (IP) and wherein the password protected request is converted to digital data and the password protected request gains access to the digital data network in addition to gaining access to the wireless telephone system;
    encoding the message for satellite transmission; and
    transmitting the message to a satellite via the second subscription service for delivery to the satellite radio receiver, wherein the satellite radio receiver decodes the message, and
    wherein the password protected request includes a specific location for finding the message on one of multiple servers of the digital data network and wherein the password protected request includes a specific destination location of the satellite radio receiver, wherein the satellite radio receiver is installed in an automobile.

2. The method of claim 1, wherein the satellite radio receiver is selected from the group of satellite radio receivers consisting of a subscription satellite music receiver and a subscription satellite television set top box.

3. The method of claim 1, wherein receiving the password protected request from a subscriber via the wireless communication device includes receiving the request via a wireless telephone.

4. The method of claim 1, wherein receiving the password protected request from a subscriber via the wireless communication device includes receiving the request via a wireless pager.

5. The method of claim 1, wherein receiving the password protected request from the subscriber via the wireless communication device includes receiving the request via a wireless personal digital assistant.

6. The method of claim 1, wherein receiving the password protected request includes receiving identification information associated with the subscriber.

7. The method of claim 1, wherein retrieving the message from the a message server includes retrieving text message.

8. The method of claim 7, wherein retrieving text message includes retrieving electronic mail message.

9. The method of claim 7, wherein retrieving text message includes retrieving electronic fax message.

10. The method of claim 1, wherein retrieving message from a message server includes retrieving voice message.

11. The method of claim 1, wherein encoding the message for satellite transmission includes converting the message to voice message.

12. The method of claim 1, wherein encoding the message for satellite transmission includes digitizing the message.

13. The method of claim 1, wherein transmitting the message via an RF transmitter to the satellite for delivery to the satellite radio receiver includes uplinking the message to a satellite.

14. The method of claim 1, further comprising:
receiving the message from the satellite at the satellite radio receiver;
decoding the message; and
presenting the message in audio form.

15. A computer program stored on a computer readable medium, the computer program comprising instructions to:
receive a password protected request from a subscriber via a wireless communication device associated with a first subscription service to
retrieve the subscriber's personal message, wherein the first subscription service comprises a wireless telephone system and wherein the password protected request gains access to the wireless telephone system;
retrieve the message stored for a subscriber from a message server via a second subscription service, wherein the second subscription service comprises a digital data network that transfers data using Internet Protocol (IP) and wherein the password protected request is converted to digital data and the password protected request gains access to the digital data network in addition to gaining access to the wireless telephone system; and encode the message via the server for satellite transmission; transmit the message to a satellite via the second subscription service for delivery to the satellite radio receiver, wherein the satellite radio receiver decodes the messagte, and wherein the password protected request includes a specific location for finding the message on one of multiple servers of the digital data network and wherein the password protected request includes a specific destination location of the satellite radio receiver, wherein the satellite radio receiver is installed in an automobile.

16. The computer program of claim 15, further comprising instructions to convert the message to audio message via the server.

17. The computer program of claim 15, further comprising instructions to digitize the message via the server.

18. A system for delivering a stored message to a satellite radio receiver, the system comprising:
means for receiving a password protected request from a subscriber via a wireless communication device associated with a first subscription service to retrieve the subscriber's personal message, wherein the first subscription service cormprises a wireless telephone system and wherein the password protected request gains access to the wireless telephone system;
means for retrieving the message from a message server of a second subscription service, wherein the second subscription service comprises a digital data network that transfers data using Internet Protocol (IP) and wherein the password protected request is converted to digital data and the password protected request gains access to the digital data network in addition to gaining access to the wireless telephone system;
means for encoding the message via a server for satellite transmission;
means for transmitting the message to a satellite via the second subscription service for delivery to the satellite radio receiver, wherein the satellite radio receiver decodes the message, and
wherein the password protected request includes a specific location for finding the message on one of multiple servers of the digital data network and wherein the password protected request includes a specific destination location of the satellite radio receiver, wherein the satellite radio receiver is installed in an automobile.

19. The method of claim 1, wherein a delivery option on the wireless communication device enables the subscriber to select delivery of the message in a text format or in a voice format.

20. The system of claim 18, wherein a delivery option on the wireless communication device enables the subscriber to select delivery of the message in a text format or in a voice format.

* * * * *